E. C. SMITH.
Nut-Lock.

No. 213,354.   Patented Mar. 18, 1879.

Witnesses.

Inventor.

UNITED STATES PATENT OFFICE.

EDWARD C. SMITH, OF MIDDLETOWN, CONNECTICUT, ASSIGNOR TO HIMSELF AND GEORGE M. SOUTHMAYD, OF SAME PLACE, ONE-HALF TO EACH.

IMPROVEMENT IN NUT-LOCKS.

Specification forming part of Letters Patent No. 213,354, dated March 18, 1879; application filed August 31, 1878.

*To all whom it may concern:*

Be it known that I, EDWARD C. SMITH, of Middletown, in the county of Middlesex and State of Connecticut, have invented certain new and useful Improvements in Lock-Nuts; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My improvement relates to a novel method of securing nuts upon screw-bolts so that they cannot become loose from jarring or any other cause.

The object of my improvement is to provide a more effective lock-nut than has heretofore been in use.

My invention consists in the peculiar construction of bolt and nut, that will be hereinafter described.

Figure 1:
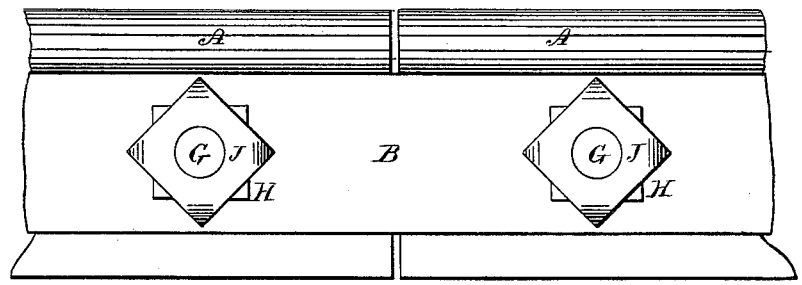
Figure 2:
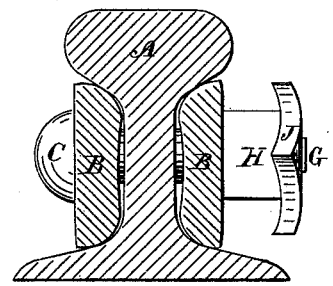
Figure 3:
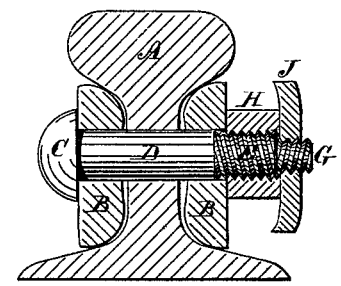

In the accompanying drawings, Figure 1 shows a side view of my invention as applied to clamping the fish-plates to a railway-bar. Fig. 2 is an end view of the same. Fig. 3 shows a section through the bar and fish-plates where the bolt passes through, with a full view of the bolt and screw-threads.

A is part of a railway-bar. B B are fish-plates for securing and strengthening the joint between the ends of two adjacent rails. These fish-plates are required to be firmly bolted to the rail against the sides, so as to unite the ends of the rails in such a manner as to prevent lateral and vertical motion.

With bolts of the ordinary construction the jar of passing trains and the longitudinal expansion of the rails by changes in temperature soon loosen the nuts and destroy the rigidity of the connection, and it is especially to such purposes as this that my invention is applicable.

C is the head of the bolt. D is the shank. E is a right-handed screw-thread upon the shank of the bolt. G is a left-handed screw-thread upon a continuation of the shank of the bolt, but of a smaller diameter, so that a nut can be passed over it to the inner thread upon the shank. These two threads are in reverse direction. The inner one is preferably made right-handed on account of its being the larger and more important, as above described; but it is not essential so long as the two threads are in opposite directions.

H is the principal nut upon the inner and larger thread. This is screwed up firmly against the object to be held by the bolt. J is a clamp-nut upon the exterior or smaller reversed thread, and is screwed up against the principal nut after it is in place.

The nut H is made of the ordinary thickness and strength, while the nut J is made thinner, and with corners extending over the sides of the nut H, so that they can be bent over slightly and prevent the two nuts turning one upon the other. While held in this position, it will be observed, any tendency of the inner or principal nut to unscrew or become loose will only bind the two nuts more firmly together, the reverse thread of the outer nut entirely checking any rotary movement.

The nut J does not bear any of the strain upon the bolt, but only resists the turning of the principal nut, so that it can be made very thin and sufficiently flexile to be readily clamped by turning down its corners.

What I claim as my invention is—

The combination, with a screw-bolt and its ordinary nut, H, of the flexile locking-nut J, having a reversed thread fitted upon a reduced screw-threaded continuation of the shank of the bolt, substantially as herein described.

EDWARD C. SMITH.

Witnesses:
THEO. G. ELLIS,
WENDELL R. CURTIS.